(12) United States Patent
Lee

(10) Patent No.: US 7,858,240 B2  
(45) Date of Patent: Dec. 28, 2010

(54) ELECTRODE ASSEMBLY AND POUCH TYPE LITHIUM RECHARGEABLE BATTERY HAVING THE SAME

(75) Inventor: Sang-Ho Lee, Yongin-si (KR)

(73) Assignee: Samsung SDI Co., Ltd., Gongse-dong, Giheung-gu, Yongin-si, Gyeonggi-do (KR)

(*) Notice: Subject to any disclaimer, the term of this patent is extended or adjusted under 35 U.S.C. 154(b) by 795 days.

(21) Appl. No.: 11/727,863

(22) Filed: Mar. 28, 2007

(65) Prior Publication Data

US 2007/0231701 A1   Oct. 4, 2007

(30) Foreign Application Priority Data

Mar. 28, 2006   (KR) .................. 10-2006-0027955

(51) Int. Cl.
  H01M 2/16   (2006.01)
  H01M 6/10   (2006.01)
  H01M 6/12   (2006.01)
  H01M 4/02   (2006.01)

(52) U.S. Cl. .............. 429/249; 429/94; 429/162; 429/211

(58) Field of Classification Search ............ 429/162, 429/184, 211, 247, 137
See application file for complete search history.

(56) References Cited

U.S. PATENT DOCUMENTS

| 7,201,998 B2 * | 4/2007 | Kim ............... 429/180 |
| 7,427,453 B2 * | 9/2008 | Kim ............... 429/170 |
| 7,722,984 B2 * | 5/2010 | Kim et al. ....... 429/176 |

FOREIGN PATENT DOCUMENTS

| JP | 08-007877 | | 1/1996 |
| KR | 10-2004-0022919 | * | 3/2004 |
| KR | 1020040022919 | | 3/2004 |
| KR | 1020040074507 | | 8/2004 |
| KR | 10-2007-0056493 | * | 6/2006 |

* cited by examiner

Primary Examiner—Patrick Ryan  
Assistant Examiner—Thomas H. Parsons  
(74) Attorney, Agent, or Firm—Robert E. Bushnell, Esq.

(57) ABSTRACT

The present invention relates to an electrode assembly and a pouch type lithium rechargeable battery having the same, which can minimize the total volume of a battery while maximizing a distance between electrode tabs. Insulation members cover portions of electrode tabs to prevent contact of an electrode tab with another electrode tab and electrode plate with opposite polarity. The shape of the insulation member is changed to effectively increase the distance between electrode tabs and to reduce overall thickness or width of the battery.

20 Claims, 7 Drawing Sheets

ELECTRODE ASSEMBLY AND POUCH TYPE LITHIUM RECHARGEABLE BATTERY HAVING THE SAME

CLAIM OF PRIORITY

This application makes reference to, incorporates the same herein, and claims all benefits accruing under 35 U.S.C. §119 from an application for ELECTRODE ASSEMBLY BODY AND POUCH TYPE LITHIUM RECHARGEABLE BATTERY HAVING THE SAME earlier filed in the Korean Intellectual Property Office on the 28 Mar. 2006 and there duly assigned Serial No. 10-2006-0027955.

BACKGROUND OF THE INVENTION

1. Field of the Invention

The present invention relates to a rechargeable battery, and more particularly, to an electrode assembly and a pouch type lithium rechargeable battery having the same, which can minimize the total width of a battery while maximizing a distance between electrode tabs by changing the shape of insulation members surrounding the electrode tabs positioned on the electrode assembly.

2. Description of the Related Art

Generally, a rechargeable battery refers to a battery that is capable of charging and discharging, which is different from a non-chargeable battery. The rechargeable battery is widely used in electronic apparatuses such as a cellular phone, a notebook computer, a camcorder, and the like. In particular, a lithium rechargeable battery has been increasingly used because it can have an output voltage of 3.6V that is three times higher than an output voltage of a nickel-cadmium battery or a nickel-hydrogen battery. The energy density per weight of the lithium rechargeable battery is also higher than that of a nickel-cadmium battery or a nickel-hydrogen battery.

The lithium rechargeable battery uses a lithium-based oxide as a positive electrode active material and a carbon material as a negative electrode active material. Generally, the lithium rechargeable battery is classified into a liquid electrolyte battery and a polymer electrolyte battery in accordance with the kind of an electrolyte. A lithium rechargeable battery using a liquid electrolyte is called as a lithium ion battery, and a lithium rechargeable battery using a polymer electrolyte is called as a lithium polymer battery. Furthermore, the lithium rechargeable battery can be formed in various types. Typical types of the lithium rechargeable battery include cylindrical type, rectangular type, and pouch type.

The lithium polymer battery, which has been popular in recent years, can be formed in a flexible pouch type, and thus its shape is unrestricted. Furthermore, the lithium polymer battery has an excellent stability, and is lightweight. Therefore, it has an advantage for the applications of the devices that requires slimness and light weight.

As electronic apparatuses, such as a digital camera, a cellular phone, a personal digital assistant (PDA), become smaller, a demand for small size battery has increased. Hence, the width of a battery becomes narrower, and accordingly the distance between a positive and a negative electrode tabs becomes smaller. In this case, the chance that the positive electrode tab accidentally contacts the negative electrode tab increases, making the battery short-circuit. There is also a chance that an electrode tab accidentally contacts an electrode plate of opposite polarity, which also causes a short-circuit of the battery. Therefore, in spite of the high demand for the smaller battery, there is limitations for narrowing the distance between the electrode tabs.

Accordingly, a technical solution is required to minimize the total width of a battery while maximizing a distance between electrode tabs so as to prevent a short-circuit between the electrode tabs and between the electrode tabs and electrode plates.

SUMMARY OF THE INVENTION

The present invention has been contrived to solve the aforementioned problems. An aspect of the present invention is to provide an electrode assembly and a pouch type lithium rechargeable battery having the same, which can minimize the total width of a battery while maximizing a distance between electrode tabs by changing the form of insulation members surrounding the electrode tabs positioned on the electrode assembly.

An electrode assembly for accomplishing the aforementioned aspect of an embodiment of the present invention includes a positive electrode plate including a positive electrode coating portion and a positive electrode non-coating portion, a negative electrode plate including a negative electrode coating portion and a negative electrode non-coating portion, a separator interposed between the positive electrode plate and the negative electrode plate to insulate the positive electrode plate from the negative electrode plate, a positive electrode tab including a positive electrode tab protrusion and a positive electrode tab body, a negative electrode tab including a negative electrode tab protrusion and a negative electrode tab body, a positive insulation member formed on the positive electrode tab covering an interface between the positive electrode tab protrusion and the positive electrode tab body, and a negative insulation member formed on the negative electrode tab covering an interface between the negative electrode tab protrusion and the negative electrode tab body.

A positive electrode active material is coated on at least one side of the positive electrode coating portion, and a negative electrode active material is coated on at least one side of the negative electrode coating portion. The positive electrode tab protrusion protrudes out of the positive electrode plate along a first direction, and the positive electrode tab body is coupled to the positive electrode non-coating portion. The negative electrode tab protrusion protrudes out of the negative electrode plate along the first direction, and the negative electrode tab body is coupled to the negative electrode non-coating portion. The positive insulation member includes a positive insulation wide portion and a positive insulation narrow portion. The positive insulation wide portion covers a portion of the positive electrode tab protrusion, and a width of the positive insulation wide portion is greater than a width of the positive insulation narrow portion. The negative insulation member includes a negative insulation wide portion and a negative insulation narrow portion. The negative insulation wide portion covers a portion of the negative electrode tab protrusion, and a width of the negative insulation wide portion is greater than a width of the negative insulation narrow portion.

The positive insulation wide portion can be spaced apart by a first predetermined distance along the first direction from the interface between the positive electrode tab protrusion and the positive electrode tab body. The separator can protrude along the first direction by a second predetermined distance from the positive electrode plate. The first predetermined distance can be the same as the second predetermined distance.

The positive electrode plate, the separator, and the negative electrode plate are laminated to form a stack, and the stack is wound about both of the positive electrode tab and the negative electrode tab. The wound stack has a top surface through which the positive electrode tab and the negative electrode tab protrude, and a side surface. The side surface may have a flat portion and a curved portion.

In one embodiment, none of edges, which are formed along the first direction, of the positive insulation wide portion is aligned with an edge, which are formed along the first direction, of the positive insulation narrow portion, so that the positive insulation member has a shape of 'T', with the positive insulation wide portion having '-' shape and with the positive insulation narrow portion having '|' shape. None of edges, which are formed along the first direction, of the negative insulation wide portion is aligned with an edge, which are formed along the first direction, of the negative insulation narrow portion, so that the negative insulation member has a shape of 'T', with the negative insulation wide portion having '-' shape and with the negative insulation narrow portion having '|' shape.

The width of the positive insulation wide portion can be greater than a width of the positive electrode body, and the width of the negative insulation wide portion can be greater than a width of the negative electrode body. The width of the positive insulation narrow portion can be the same as the width of the positive electrode tab body, and the width of the negative insulation narrow portion can be the same as the width of the negative electrode tab body.

The stack of the positive electrode plate, the separator, and the negative electrode plate may wrap both of the positive insulation narrow portion and the negative insulation narrow portion about the first direction. The width direction of the positive insulation wide portion can be parallel to the flat portion of the side surface of the wound stack and one edge of the positive insulation wide portion intrudes into the curved portion of the side surface of the wound stack when viewed from the top surface of the wound stack, and the width direction of the negative insulation wide portion can be parallel to the flat portion of the side surface of the wound stack and one edge of the negative insulation wide portion intrudes into the curved portion of the side surface of the wound stack when viewed from the top surface of the wound stack.

In another embodiment, the positive insulation wide portion and the positive insulation narrow portion can be are separated so that there can be a gap between the positive insulation wide portion and the positive insulation narrow portion.

The positive insulation wide portion may include an insulation tape or a laminated tape. Each of the insulation tape and the laminated tape can be made of a material such as polyphenylene sulfide (PS), polyimide (PI), and polypropylene (PP).

In still another embodiment, the positive insulation wide portion and the positive insulation narrow portion are integrally formed.

In still another embodiment, one of edges, which are formed along the first direction, of the positive insulation wide portion is aligned with an edge, which are formed along the first direction, of the positive insulation narrow portion, so that the positive insulation member has a shape of an inverted 'L', with the positive insulation wide portion having '-' shape and with the positive insulation narrow portion having '|' shape. The width direction of the positive insulation wide portion can be parallel to the flat portion of the side surface. The width of the positive insulation narrow portion can be the same as a width of the positive electrode tab body.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
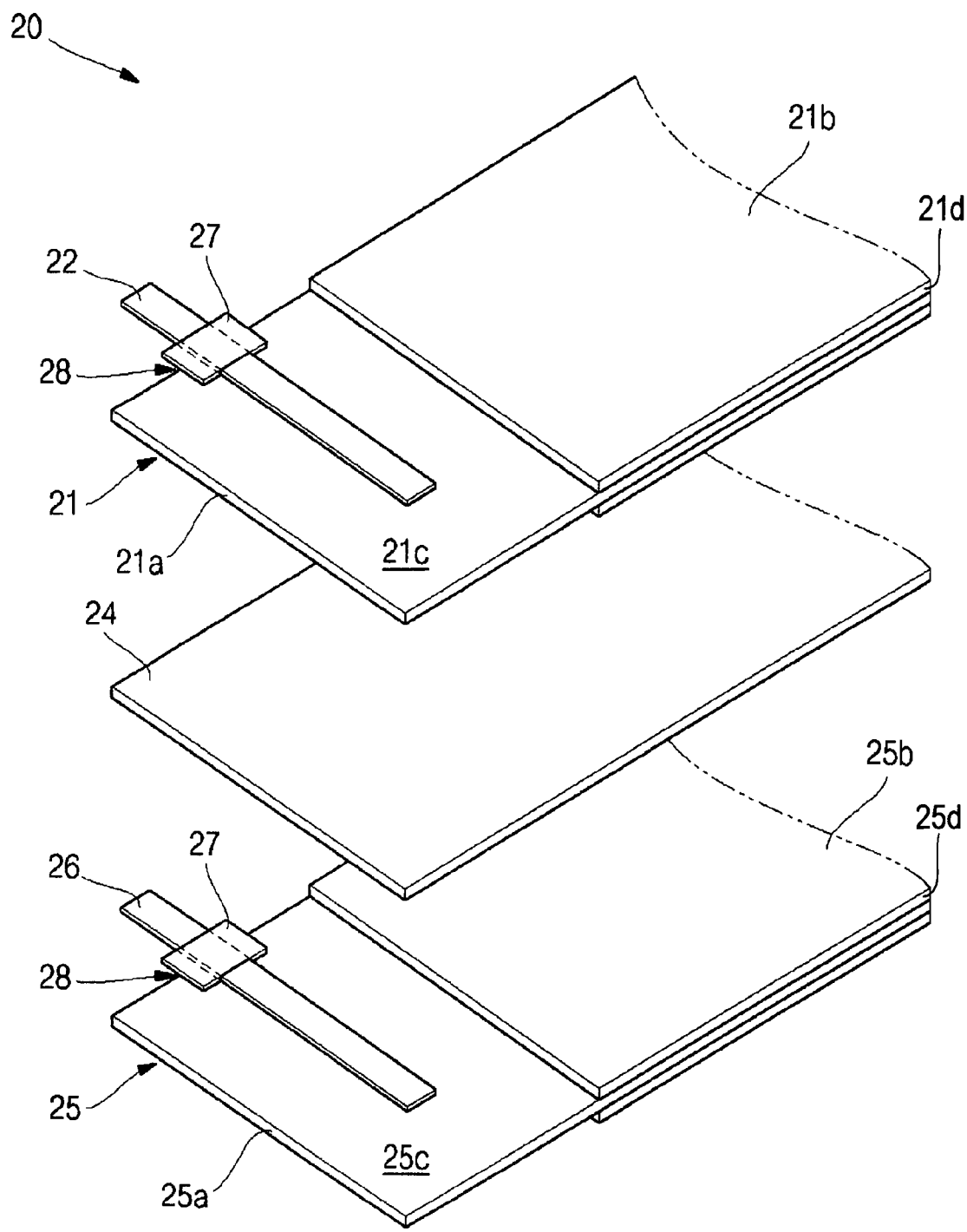
FIG. 1 is a perspective view showing electrodes of an electrode assembly of a pouch type lithium rechargeable battery.
Figure 2:
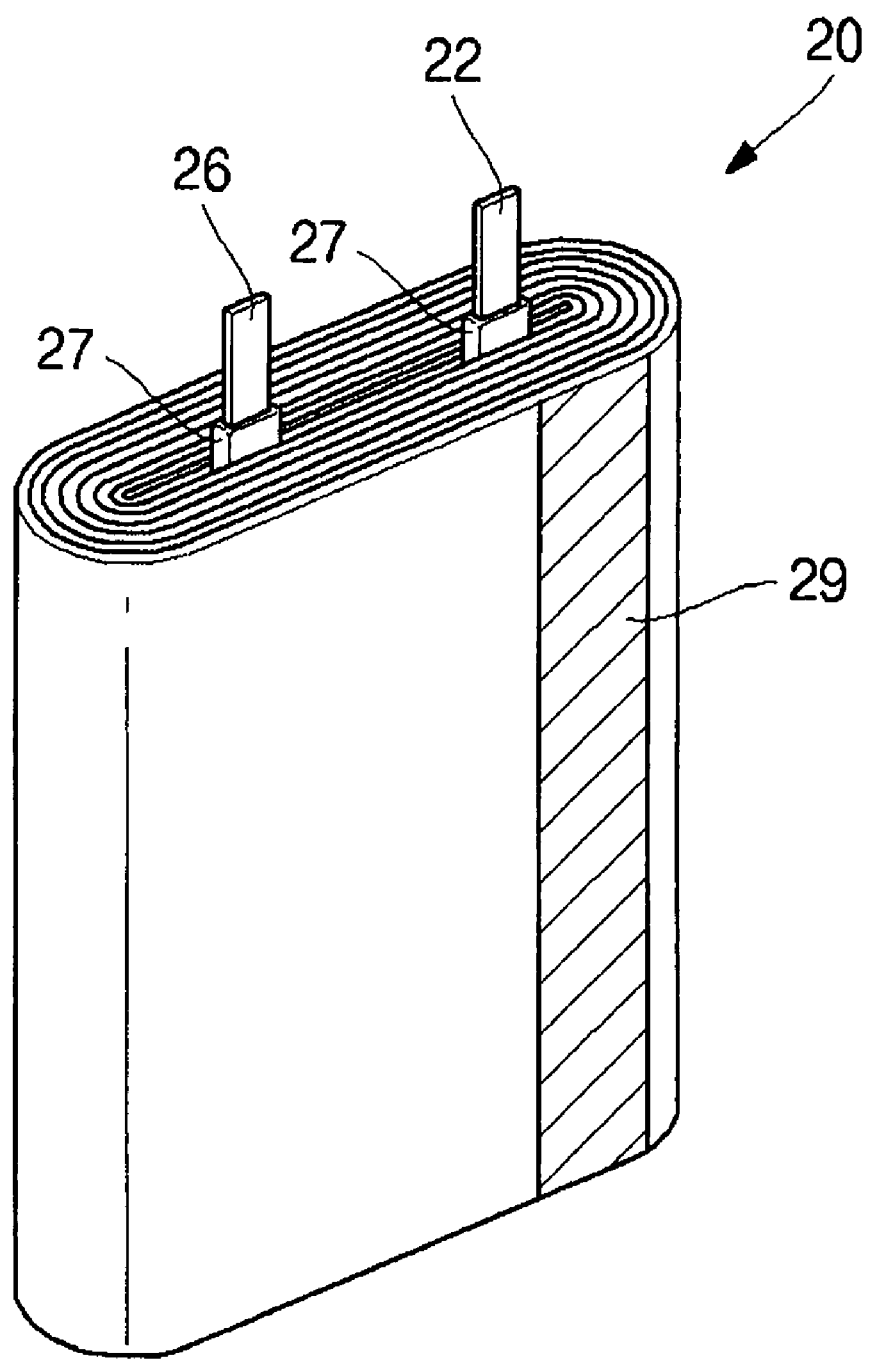
FIG. 2 is a perspective view showing the electrode assembly of FIG. 1 after the electrodes are wound.

FIG. 1 is a perspective view illustrating electrodes of an electrode assembly of a pouch type lithium rechargeable battery, and FIG. 2 is a perspective view illustrating the electrode assembly of FIG. 1 after the electrodes are wound.

A pouch type lithium rechargeable battery includes an electrode assembly and a pouch that stores the electrode assembly. Hereinafter, the description will be made in connection with the structure of the electrode assembly with reference to FIG. 1.

As shown in FIG. 1, electrode assembly 20 includes positive electrode plate 21, negative electrode plate 25, and separator 24 that is interposed between positive electrode plate 21 and negative electrode plate 25.

The positive electrode plate 21 includes positive electrode collector 21$a$ that includes positive electrode coating portion 21$b$ and positive electrode non-coating portion 21$c$. Positive electrode active material 21$d$ is coated on both sides of positive electrode coating portion 21$b$. Positive electrode tab 22 is attached to positive electrode non-coating portion 21$c$ of positive electrode collector 21$a$. Positive electrode active material 21$d$ is not formed on positive electrode non-coating portion 21$c$.

Similar to positive electrode plate 21, negative electrode plate 25 includes negative electrode collector 25$a$ that includes negative electrode coating portion 25$b$ and negative electrode non-coating portion 25$c$. Negative electrode active material 25$d$ is coated on both sides of negative electrode coating portion 25$b$. Negative electrode active material 25$d$ is not formed on negative electrode non-coating portion 25$c$. Negative electrode tab 26 is attached to negative electrode non-coating portion 25$c$ of negative electrode collector 25$a$.

Herein, the structures of positive electrode plate 21 and negative electrode 25 are symmetric, and therefore the terms of positive and negative are relative and exchangeable.

Each of positive electrode tab 22 and negative electrode tab 26 has interface 28, from which positive electrode tab 22 protrudes out of positive electrode plate 21 or from which negative electrode tab 26 protrudes out of negative electrode plate 25. Insulation member 27 is formed on each of positive electrode tab 22 and negative electrode tab 26 covering interface 28. Insulation member 27 has wider width than each of positive electrode tab 22 and negative electrode tab 26. Therefore, short-circuit between an electrode tab and an electrode plate of opposite polarity can be prevented.

Separator 24 is interposed between positive electrode plate 21 and negative electrode plate 25. In order to prevent contact between positive electrode plate 21 and negative electrode plate 25, it is preferred that separator 24 is wider than positive electrode plate 21 and negative electrode plate 25.

Positive electrode plate 21, separator 24, and negative electrode plate 25 are formed into a stack, and the stack is wound in one direction about positive electrode tab 22 and negative electrode tab 26 by the use of a winding machine such as a mandrel. The wound stack forms electrode assembly 20 as shown in FIG. 2. Here, in order to prevent the wound structure of electrode assembly 20 from being released, adhesive tape 29 is attached to the outermost surface of electrode assembly 20.

Referring to the structure of electrode assembly 20, positive electrode tab 22 and negative electrode tab 26 are positioned to be spaced apart by a predetermined distance from the center of wound electrode assembly 20. One end of each of positive electrode tab 22 and negative electrode tab 26 protruded out of electrode assembly 20.

During the winding process of electrode assembly 20, the stack of positive electrode plate 21, separator 24, and negative electrode plate 25 is also wound around insulation member 27 formed inside or below interface 28 of each of positive electrode tab 22 and negative electrode tab 26. Because insulation member 27 encloses each of positive electrode tab 22 and negative electrode tab 26, the width of insulation member 27 is greater than the width of each of positive electrode tab 22 and negative electrode tab 26. Even though insulation member 27 can be squeezed by the stack of electrode assembly 20, the stack cannot be tightly wound around electrode tabs 22 and 26, because of the larger width of insulation member 27.

Hereinafter, preferred embodiments of the present invention will be described with reference to the accompanying drawings.

Figure 3:
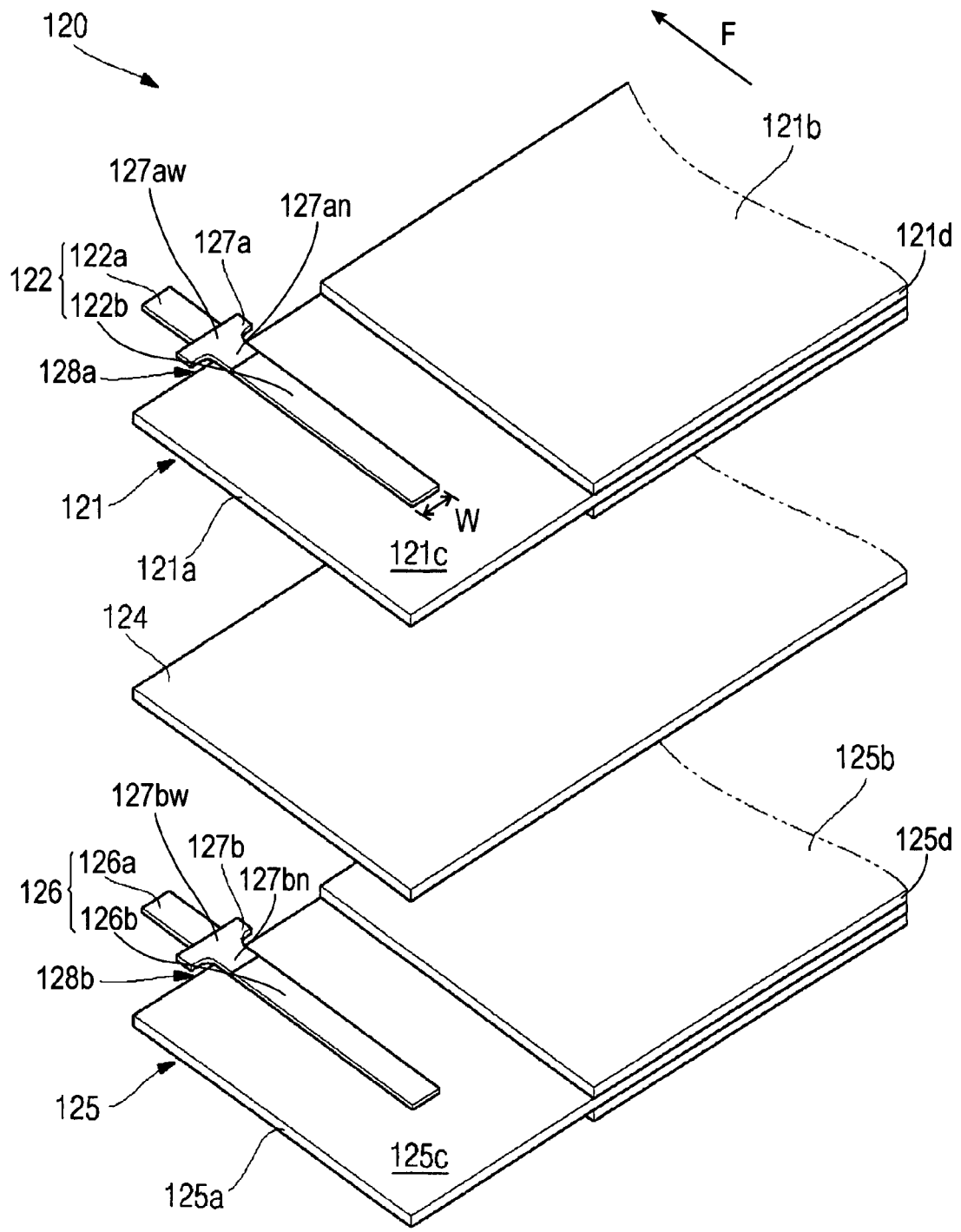
FIG. 3 is a perspective view showing electrodes of an electrode assembly constructed as an embodiment of the present invention.
Figure 4:
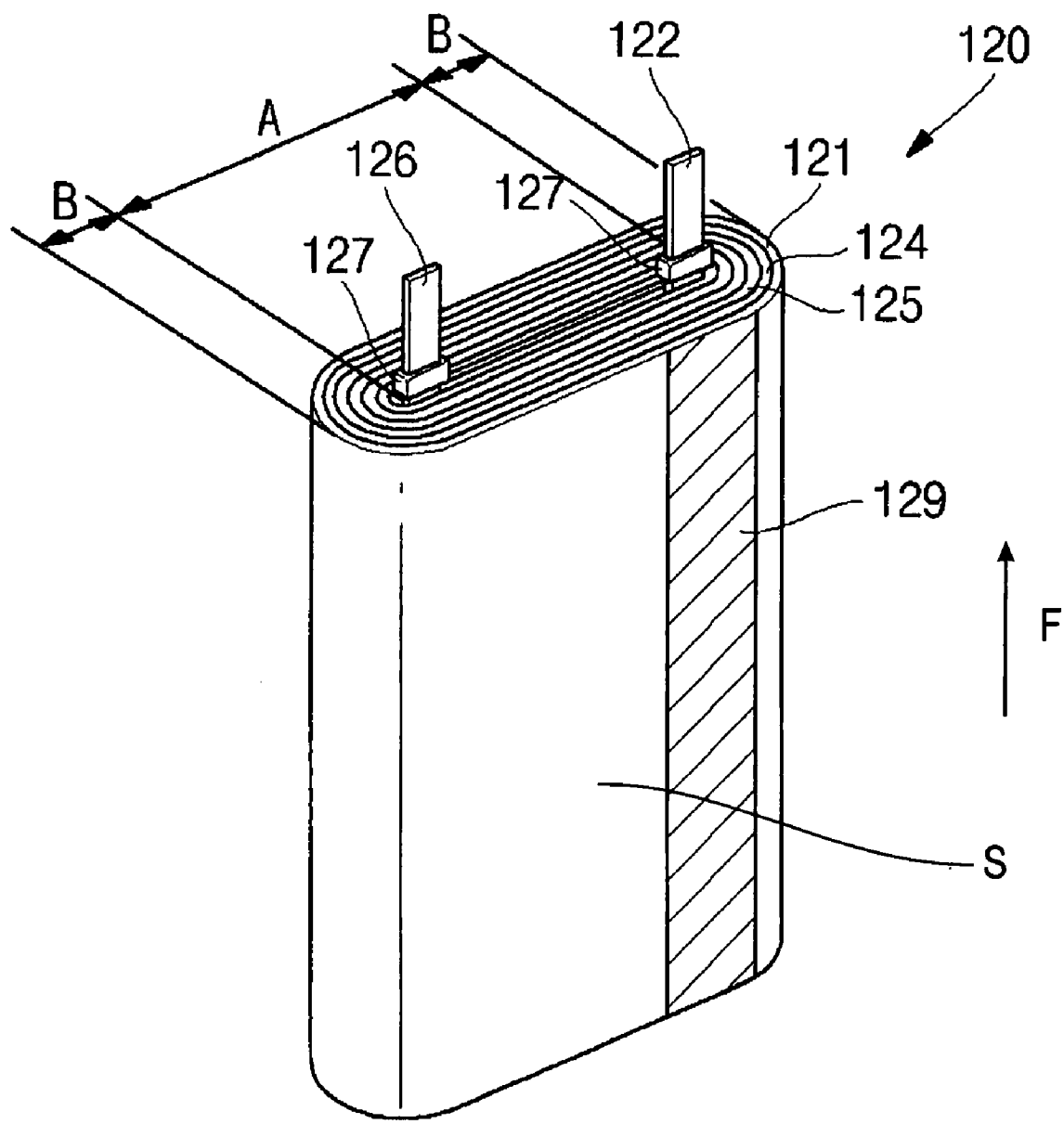
FIG. 4 is a perspective view showing the electrode assembly of FIG. 3 after the electrodes are wound.

FIG. 3 is a perspective view showing electrodes of an electrode assembly constructed as an embodiment of the present invention, and FIG. 4 is a perspective view showing the electrode assembly of FIG. 3 after the electrodes are wound.

Referring to FIG. 3, electrode assembly 120 includes positive electrode plate 121, negative electrode plate 125, and separator 124 that is interposed between positive electrode plate 121 and negative electrode plate 125.

Positive electrode plate 121 has positive electrode collector 121a that includes positive electrode coating portion 121b and positive electrode non-coating portion 121c. Positive electrode active material 121d is coated on at least one side of positive electrode coating portion 121b. Positive electrode active material 121d is not formed on positive electrode non-coating portion 121c. Positive electrode collector 121a is made of a metal sheet having excellent conductivity, such as aluminum foil. A chalcogenide compound is used for positive electrode active material 121d. For example, composite metal oxides such as $LiCoO_2$, $LiMn_2O_4$, $LiNiO_2$, $LiNi_{1-x}CoxO_2$ (0<x<1), $LiMnO_2$ or the like can be used for positive electrode active material 121d, but the material is not limited thereto.

Positive electrode tab 122 is formed on positive electrode non-coating portion 121c. Positive electrode tab 122 includes positive electrode tab protrusion 122a and positive electrode tab body 122b. Positive electrode tab protrusion 122a protrudes out of positive electrode plate 121, and positive electrode tab body 122b is coupled to positive electrode non-coating portion 121c.

Negative electrode plate 125 has negative electrode collector 125a that includes negative electrode coating portion 125b and negative electrode non-coating portion 125c. Negative electrode active material 125d is coated on at least one side of negative electrode coating portion 125b. Negative electrode active material 125d is not formed on negative electrode non-coating portion 125c. Negative electrode collector 125a is made of a conductive metal sheet, such as copper or nickel foil. For negative electrode active material 125d, carbon-based material, Si, Sn, tin oxide, composite tin alloy, transition metal oxide, lithium metal nitride, or lithium metal oxide can be used, but the material is not limited thereto.

Negative electrode tab 126 is formed on negative electrode non-coating portion 125c. Negative electrode tab 126 includes negative electrode tab protrusion 126a and negative electrode tab body 126b. Negative electrode tab protrusion 126a protrudes out of negative electrode plate 125, and negative electrode tab body 126b is coupled to negative electrode non-coating portion 125c.

Separator 124 prevents contact between positive electrode plate 121 and negative electrode plate 125. Separator 124 can be made of a material such as polyethylene, polypropylene, copolymer of polyethylene, or polypropylene, but not limited thereto. In order to prevent contact between positive electrode plate 121 and negative electrode plate 125, it is preferred that separator 124 is wider than positive electrode plate 121 and negative electrode plate 125. In other words, separator 124 has larger surface area than positive electrode plate 121 and negative electrode plate 125.

Herein, the structures of positive electrode plate 121 and negative electrode 125 are symmetric, and therefore the terms of positive and negative are relative and exchangeable.

As described above, positive electrode tab 122 includes positive electrode tab protrusion 122a and positive electrode tab body 122b. Interface 128a of positive electrode tab 122 is formed between positive electrode tab protrusion 122a and positive electrode tab body 122b. Interface 128a is formed on positive electrode tab 122 along an edge of positive electrode plate 121. Therefore, positive electrode tab protrusion 122a, which is formed above interface 128a, protrudes beyond the edge of positive electrode plate 121.

Positive insulation member 127a is formed on positive electrode tab 122 covering interface 128a. Positive insulation member 127a prevents direct contact of positive electrode tab 122 with other elements of electrode assembly 120 that has opposite polarity. Positive insulation member 127a includes positive insulation wide portion 127aw and positive insulation narrow portion 127an. Positive insulation wide portion 127aw covers a portion of positive electrode tab protrusion 122a. Positive insulation narrow portion 127an mostly covers a portion of positive electrode tab body 122b, but also can cover a part of positive electrode tab protrusion 122a and interface 128a of positive electrode tab 122.

Similar to positive electrode tab 122, negative electrode tab 126 includes negative electrode tab protrusion 126a and negative electrode tab body 126b. Interface 128b of negative electrode tab 126 is formed between negative electrode tab protrusion 126a and negative electrode tab body 126b. Interface 128b is formed on negative electrode tab 126 along an edge of negative electrode plate 125. Therefore, negative electrode tab protrusion 126a protrudes beyond the edge of negative electrode plate 125.

Negative insulation member 127b is formed on negative electrode tab 126 covering interface 128b. Negative insulation member 127b includes negative insulation wide portion 127bw and negative insulation narrow portion 127bn. Negative insulation wide portion 127bw covers a portion of negative electrode tab protrusion 126a. Negative insulation narrow portion 127bn mostly covers a portion of negative electrode tab body 126b, but also can cover a part of negative electrode tab protrusion 126a and interface 128b of negative electrode tab 126.

The functions and structures of negative insulation member 127b are the same as those of positive insulation member 127a. Therefore, hereafter positive insulation member 127a will be described. The same description can be applied to negative insulation member 127b.

Positive insulation member 127a of electrode assembly 120 of an embodiment of the present invention can be formed in a shape of 'T' as shown in FIG. 3. Positive insulation wide portion 127aw has edges that are substantially parallel to first direction F, and positive insulation narrow portion 127an also has edges that are substantially parallel to first direction F. In the 'T' shape of positive insulation member 127a, none of the edges of the positive insulation wide portion 127aw is aligned with an edge of positive insulation narrow portion 127an. Herein the term of being aligned means that the two edges are on a straight line. Therefore, if two edges are not aligned, the two edges are shifted from each other so that they cannot be on a straight line. In the 'T' shape of positive insulation member 127a, positive insulation wide portion 127aw of positive insulation member 127a has a shape of '-', and positive insulation narrow portion 127an of positive insulation member 127a has a shape of '|'. Therefore, the width of positive insulation wide portion 127aw is greater than the width of positive insulation narrow portion 127an.

Herein, terminology regarding the dimension of electrode tab and insulation member is defined as follows. By a definition, positive electrode tab protrusion 122a protrudes along first direction F. Positive electrode tab 122 has a wide surface that is substantially parallel to a surface of positive electrode plate 121, and a narrow surface that is substantially perpendicular to the surface of positive electrode plate 121. The wide surface of positive electrode tab 122 is coupled to positive electrode plate 121. A size of the wide surface of positive electrode tab 122 in a direction that is perpendicular to first direction F is defined as width W of positive electrode tab 122. A width direction is defined as a direction along which width W is defined. A width of positive insulation member 127a is defined as the same way described above. In other words, a width of positive insulation member 127a is a size of positive insulation member 127a along the width direction of positive electrode tab 122.

Returning to the description of positive insulation member 127a having a shape of 'T', the larger width of positive insulation wide portion 127aw effectively prevents contact of positive electrode tab 122 with negative electrode tab 126 and negative electrode plate 125, when the stack of positive electrode plate 121, separator 124, and negative electrode plate 125 is wound around both of positive electrode tab 122 and negative electrode tab 126, because positive insulation wide portion 127aw protrudes outside the wound stack of positive electrode plate 121, separator 124, and negative electrode plate 125. Positive insulation narrow portion 127an having a shape of '|' is placed inside the stack, and can have a width that is substantially the same as the width of positive electrode tab 122. Therefore, positive insulation narrow portion 127an effectively prevents an increase of the volume of electrode assembly 120 when the stack of positive electrode plate 121, separator 124, and negative electrode plate 125 is wound around both of positive electrode tab 122 and negative electrode tab 126.

If separator 124 is wider than positive electrode plate 121, separator 124 can protrude along first direction F out of positive electrode plate 121. In this case, positive insulation wide portion 127aw having a shape of '-' can be formed being spaced apart by a first predetermined distance from interface 128a of positive electrode tab 122 in order to avoid the collision between positive insulation wide portion 127aw and separator 124 when the stack of positive electrode plate 121, separator 124, and negative electrode plate 125 is wound around both of positive electrode tab 122 and negative electrode tab 126. If separator 124 protrudes out of positive electrode plate 121 by a second predetermined distance from an edge of positive electrode plate 121, the first predetermined distance can be substantially the same as the second predetermined distance.

The 'T'-shaped insulation member 127a can be formed in a manner that a rectangular type insulation member is first formed on positive electrode tab 122, and then a redundant portion of the insulation member overlapping positive electrode non-coating portion is cut. Therefore, The 'T'-shaped insulation member 127a prevents short-circuit of electrode assembly 120 while maintaining the maximum distance between positive electrode tab 122 and negative electrode tab 126.

Negative insulation member 127b of electrode assembly 120 of an embodiment of the present invention also can be formed in a shape of 'T' as shown in FIG. 3. The structure and function of negative insulation member 127b having a shape of 'T' are the same as positive insulation member 127a having the shape of 'T', and detailed description will be omitted.

Hereinafter, electrode assembly 120 that has the electrode structures as shown in FIG. 3, which have 'T'-shaped positive insulation member 127a and 'T'-shaped negative insulation member 127b, will be described referring to FIG. 4.

Electrode assembly 120 shown in FIG. 4 is formed by winding a stack of positive electrode plate 121 having positive electrode tab 122 and positive insulation member 127a, negative electrode plate 125 having negative electrode tab 126 and negative insulation member 127b, and separator 124 that is interposed between positive electrode plate 121 and negative electrode plate 125. The stack of electrode assembly 120 is wound around both of positive electrode tab 122 and negative electrode tab 126. The stack of electrode assembly 120 also wound around both of the '|' shaped positive insulation narrow portion and the '|' shaped negative insulation narrow portion.

The wound stack of electrode assembly 120 has top surface through which positive electrode tab 122 and negative electrode tab 126 protrude, a bottom surface that is an opposite side of the top surface, and side surface S that is substantially parallel to first direction F. Side surface S has a curved portion, which corresponds to portion B (in FIG. 4) when viewed from the top surface, and a flat portion, which corresponds to portion A when viewed from the top surface. Because the stack is wound around both of positive electrode tab 122 and negative electrode tab 126, positive electrode tab 122 is positioned at one end of flat portion A, and negative electrode tab 126 is position at the other end of flat portion A. When the stack is tightly wound, wide surfaces positive electrode tab 122 and negative electrode tab 126 becomes substantially parallel to the stack of portion A. Therefore, positive insulation wide portion 127aw and negative insulation wide portion 127bw, which are '-' shaped portions of 'T' shaped positive insulation member 127a and negative insulation member 127b, respectively, are aligned parallel to the stack of portion A as shown in FIG. 4. In this case, one edge of positive insulation wide portion 127aw intrudes into portion B, and one edge of negative wide portion 127bw also intrudes into portion B. However, positive insulation narrow portion 127an and negative insulation narrow portion 127bn, which are 'l' shaped portions of 'T' shaped positive insulation member 127a and negative insulation member 127b, respectively, remain inside portion A.

Positive insulation member 127a and/or negative insulation member 127b can have a different shape from 'T' shape. As along as the width of positive (or negative) wide portion is larger than the width of positive (or negative) narrow portion, the goal of the present invention will be achieved. One example of the different shape of Positive insulation member 127a and negative insulation member 127b is shown in FIG. 5.

Figure 5:
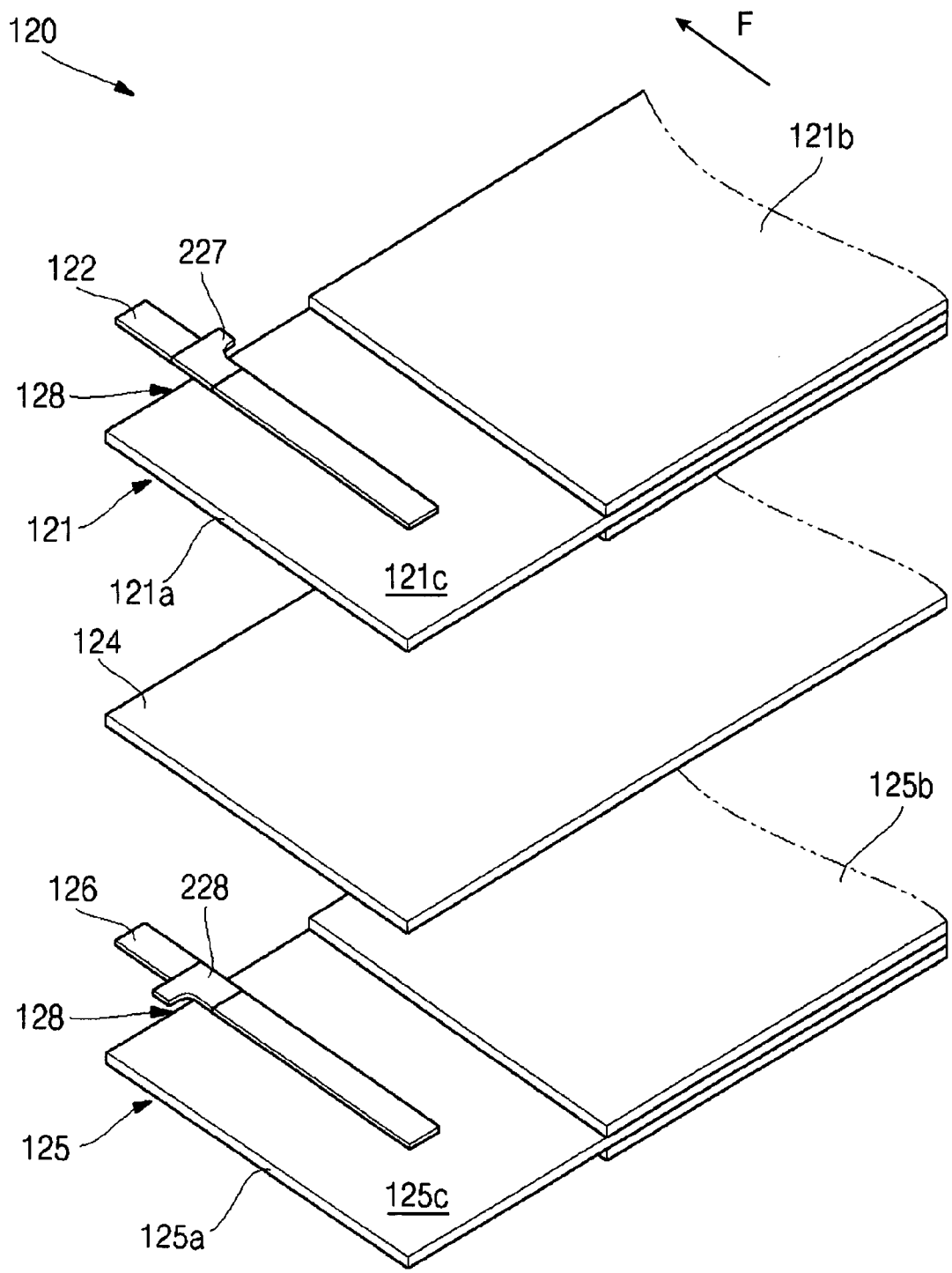
FIG. 5 is a perspective view showing the electrodes of an electrode assembly of FIG. 3, which has an insulation member having an inverted 'L' shape.

FIG. 5 is a perspective view showing a positive and a negative insulation members of the electrode assembly of the present invention, which have inverted 'L' shapes. 'T' shaped positive insulation member 127a and/or negative insulation member 127b can be replaced with positive insulation member 227 and negative insulation member 228, respectively, both of which have inverted 'L' shape as shown in FIG. 5. In the inverted 'L' shape positive and negative insulation members, one of edges, which are formed along the first direction, of the positive insulation wide portion is aligned with an edge, which are formed along the first direction, of the positive insulation narrow portion. Therefore, the aligned edges of the positive insulation wide portion and the positive insulation narrow portion are formed into a vertical side of the inverted 'L' shape. A width of the '-' shaped portion of positive insulation member 227 is greater than the width of the 'l' shaped portion of positive insulation member 227. The width of the 'l' shaped portion of positive insulation member is substantially the same as the width of positive electrode tab 122. The same structural feature is applied to negative insulation member 228.

In this case, the inverted 'L' shape positive insulation member can be arranged in a manner that the '-' shaped portion of positive insulation member 227 intrudes into portion B (curved portion) of electrode assembly 120 with the same principles as described referring to FIG. 4, when the stack of positive electrode plate 121, negative electrode plate 125, and separator 124 is tightly wound around both of positive electrode tab 122 and negative electrode tab 126. The 'l' shaped portion of positive insulation member 227 remains inside portion A (flat portion).

The same structural feature is applied to negative insulation member 228. Furthermore, as shown in FIG. 5, the '-' shaped portion of negative insulation member 228 can be heading towards an opposite direction from the '-' shaped portion of positive insulation member 227. Therefore, both of the '-' shaped portions of positive insulation member 227 and negative insulation member 228 intrude into portion B (curved portion) of electrode assembly 120.

Positive insulation member 127a prevents contact of positive electrode tab 122 with other elements of electrode assembly 120, and negative insulation member 127b prevents contact of negative electrode tab 126 with other elements of electrode assembly 120. Furthermore, positive insulation member 127a and negative insulation member 127b also prevent the contact of positive and negative electrode tabs 122 and 126 with pouch 130 (shown in FIG. 6) that stores electrode assembly 120. Therefore, it is preferred that positive and negative insulation members 127a and 127b are made of an insulation material, which can prevent flow of electrical and\or ionic current and which is resistant to an electrolyte that can be exposed to positive and negative insulation members 127a and 127b. Accordingly, positive and negative insulation members 127a and 127b can be an insulation tape which is made of a material such as polyphenylene sulfide (PS), polyimide (PI), or polypropylene (PP).

Referring to FIG. 4, adhesive tape 129 is attached to the outermost portion of electrode assembly 120 so as to prevent the wound electrode assembly 120 from being released.

As described above, electrode assembly 120 is wound surrounding the 'I'-shaped portions which are relatively narrower than the '-'-shaped portions. Therefore, electrode assembly 120 of the present invention, which has 'T' shaped positive and negative insulation members 127a and 127b, or inverted 'L' shaped positive and negative insulation members 227 and 228, can have reduced total width while maintaining the maximum distance between the positive electrode tab and the negative electrode tabs. Accordingly, the electrode assembly of the embodiment of the present invention can be applied to a small size battery by reducing the total width thereof while maintaining the maximum distance between the electrode tabs. Therefore, the electrode assembly of the present invention can prevent a short-circuit between the electrode tabs and between the electrode tabs and the electrode plates.

Figure 6:
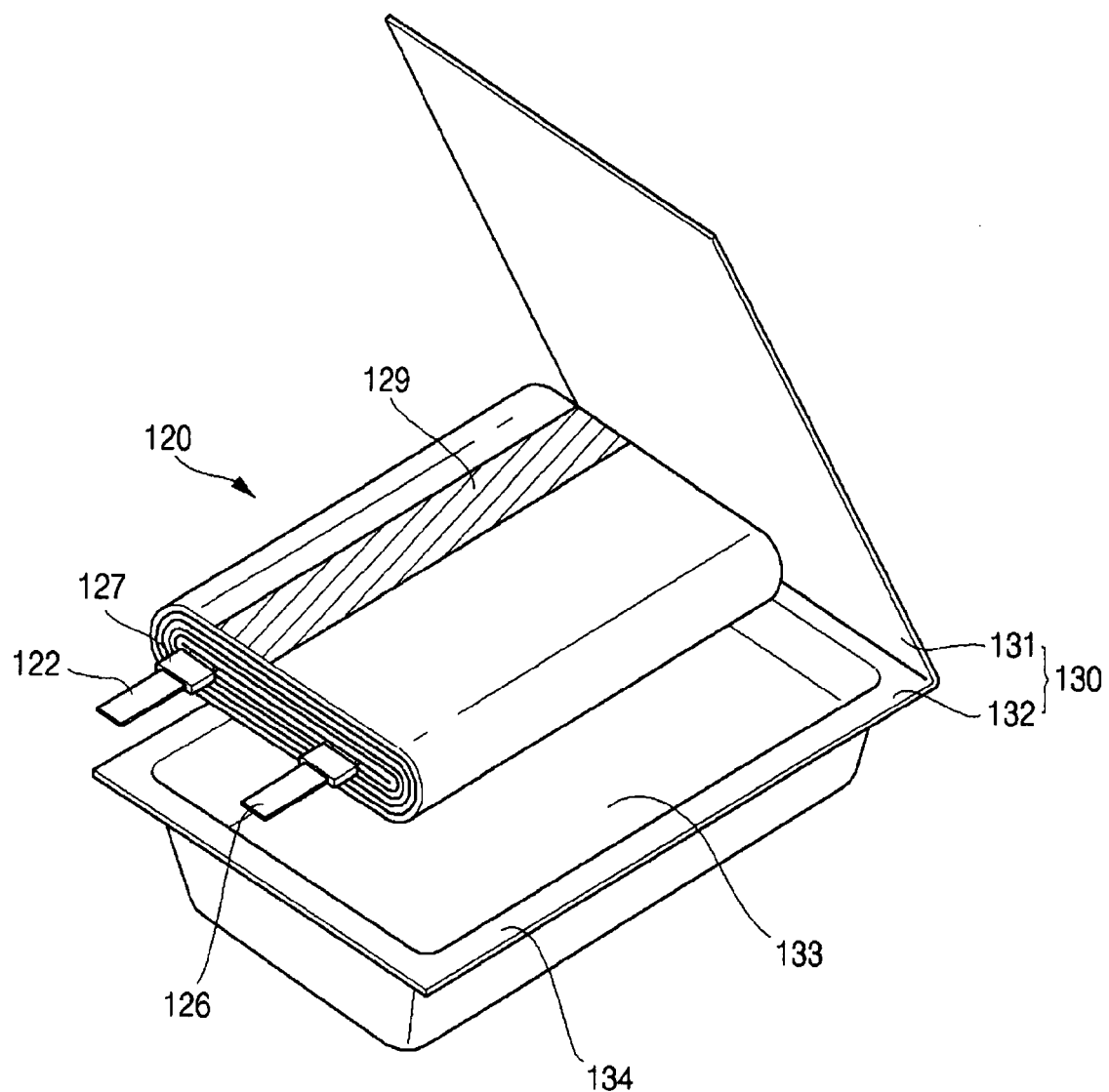
FIG. 6 is a perspective view showing a pouch type lithium rechargeable battery constructed as an embodiment of the present invention that employs the wound electrode assembly of FIG. 4.

FIG. 6 is a perspective view showing a pouch type lithium rechargeable battery constructed as an embodiment of the present invention that employs the wound electrode assembly of FIG. 4.

A pouch type lithium rechargeable battery of the embodiment of the present invention includes electrode assembly 120, and pouch 130 that stores electrode assembly 120, and an electrolyte that is filled in pouch 130.

Electrode assembly 120 has the structure as described referring FIGS. 3 and 4. Pouch 130 includes pouch rear surface 132 and pouch front surface 131. Pouch rear surface includes container 133 into which electrode assembly 120 is stored. Pouch front surface 131 covers and seals pouch rear surface 132.

Pouch 130 can have a structure, in which an insulation layer, a metal layer, and a protection layer are staked in sequence. The insulation layer is the innermost layer, and is made of a material having insulation property and thermal adhesive property. The metal layer prevents penetration of moisture and loss of an electrolyte. The protection layer is the outermost layer and protects the battery. Pouch 130, however, can be formed in various stacked structures.

Electrode assembly 120, which has the structure described referring to FIGS. 3 and 4, is mounted inside container 133 formed in pouch rear surface 132. The ends of positive electrode and negative electrode tabs 122 and 126 of electrode assembly 120 protrude beyond pouch 130. After electrode assembly 120 is mounted, an electrolyte is injected into container 133, and sealing surface 134 formed along the edge of container 133 is sealed by applying a predetermined heat and pressure. Hence, the pouch type lithium rechargeable battery is completed.

Figure 7:
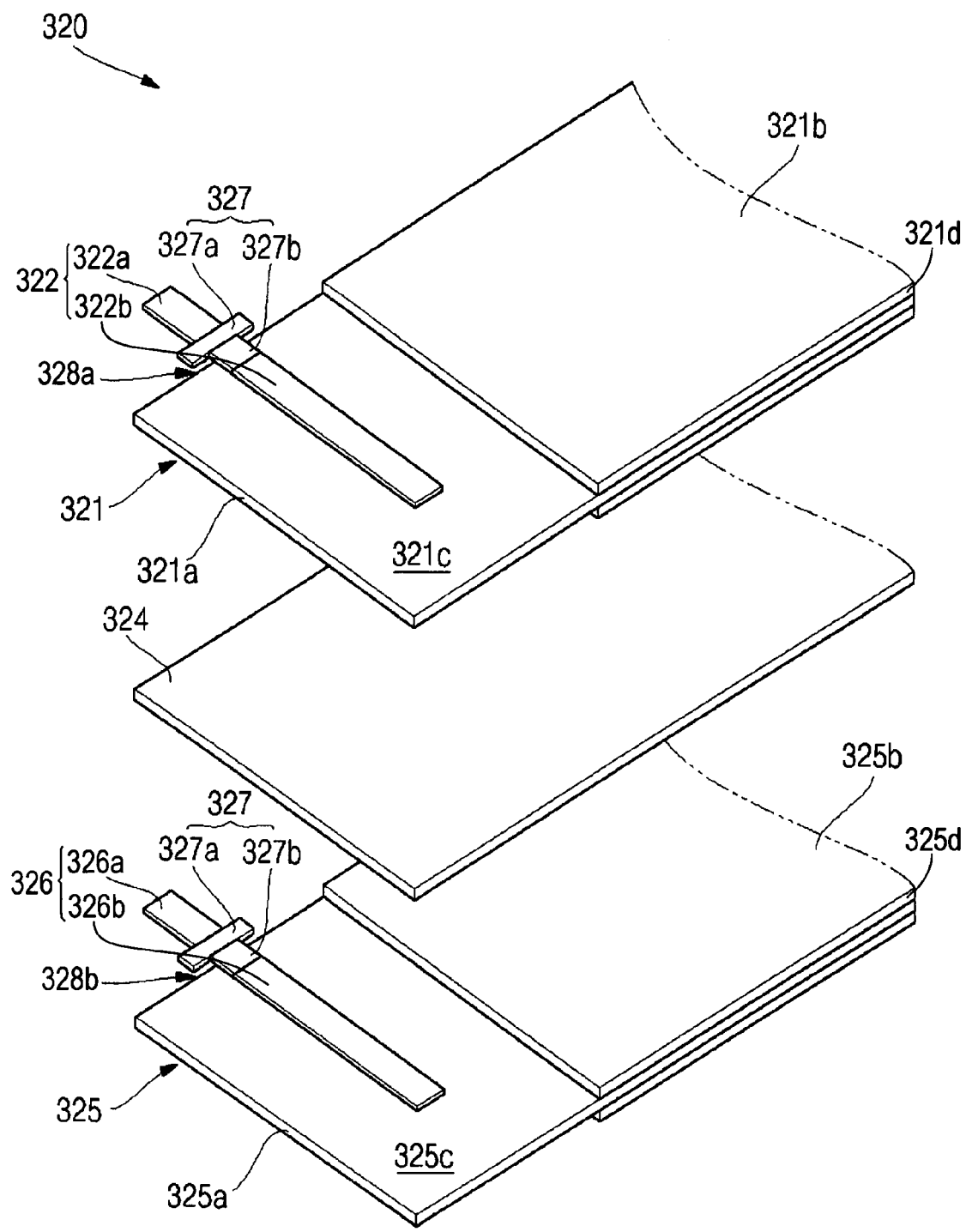
FIG. 7 is a perspective view showing electrodes of an electrode assembly constructed as another embodiment of the present invention.

FIG. 7 is a perspective view showing electrodes of an electrode assembly constructed as another embodiment of the present invention.

An electrode assembly of another embodiment of the present invention has similar structure as the electrode assembly of FIG. 3 except the positive and negative insulation members. The description about the same elements will be omitted.

As shown in FIG. 7, electrode assembly 320 includes positive electrode plate 321, negative electrode plate 325, and separator 324 that is interposed between positive electrode plate 321 and negative electrode plate 325.

Positive electrode plate 321 includes positive electrode collector 321a that includes positive electrode coating portion 321b and positive electrode non-coating portion 321c. Positive electrode active material 321d is coated on at least one side of positive electrode coating portion 321b. Positive electrode tab 322 is attached to positive electrode non-coating portion 321c. Positive electrode active material 321d is not formed on positive electrode non-coating portion 321c.

Negative electrode plate 325 includes negative electrode collector 325a that includes negative electrode coating portion 325b and negative electrode non-coating portion 325c. Negative electrode active material 325d is coated on at least one side of negative electrode coating portion 325b. Negative electrode active material 325d is not formed on negative electrode non-coating portion 325c. Negative electrode tab 326 is attached to negative electrode non-coating portion 325c.

Herein, the structures of positive electrode plate 321 and negative electrode 325 are symmetric, and therefore the terms of positive and negative are relative and exchangeable.

Positive electrode tab 322 includes positive electrode tab protrusion 322a and positive electrode tab body 322b. Interface 328a of positive electrode tab 322 is formed between positive electrode tab protrusion 322a and positive electrode tab body 322b. Interface 328a is formed on positive electrode tab 322 along an edge of positive electrode plate 321. Therefore, positive electrode tab protrusion 322a protrudes beyond the edge of positive electrode plate 321. Negative electrode tab 326 includes negative electrode tab protrusion 326a and negative electrode tab body 326b. Interface 32b of negative electrode tab 326 is formed between negative electrode tab protrusion 326a and negative electrode tab body 326b. Interface 328b is formed on negative electrode tab 326 along an edge of negative electrode plate 325. Therefore, negative electrode tab protrusion 326a protrudes beyond the edge of negative electrode plate 325.

Insulation member 327 is formed on each of positive electrode tab 322 and negative electrode tab 325. Insulation member 327 includes insulation wide portion 327a and insulation narrow portion 327b. Insulation member 327 covers interface 328a of positive electrode tab 322 or interface 328b of negative electrode tab 326.

Electrode assembly 320 of another embodiment of the present invention is provided with the 'T'-shaped insulation member 327 that have the substantially same dimensions as positive insulation member 127a or negative insulation member 127b of electrode assembly 120 of an embodiment of the present invention shown in FIG. 3. The difference between insulation member 327 and positive or negative insulation member 127a or 127b is that insulation member 327 does have an integrated structure but has a separated structure. The function and the position of insulation members 327 are the same as those of insulation members 127a or 127b as described in FIG. 3.

Unlike the insulation members 127a or 127b of FIG. 3, which can be formed by one insulation tape, insulation members 327 of the electrode assembly 320 has '-' shaped portion (insulation wide portion 327a) that can be formed by an insulation tape, and 'I' shaped portion (insulation narrow portion 327b) that can be formed by a laminated tape to reduce the thickness of the electrode assembly. Each of the insulation tape and the laminated tape can be formed of a material such as polyphenylene sulfide (PS), polyimide (PI), or polypropylene (PP) that has insulation property and resistance to an electrolyte.

Electrode assembly 320 is formed by winding positive electrode plate 321, separator 324, and negative electrode plate 325. Electrode assembly 320 is wound around both of positive electrode and negative electrode tabs 322 and 326 including the 'I' shaped portion of insulation member 327.

As described above, electrode assembly 320 is wound surrounding the 'I' shaped portion that is relatively narrower than the '-'-shaped portion. The electrode assembly 320 having the 'T' shaped insulation members 327 of another embodiment of the present invention can have a reduced total width while maintaining the distance between the electrode tabs. Accordingly, the electrode assembly of another embodiment of the present invention can be applied to a small size battery by reducing the total width thereof while maintaining maximally the distance between the electrode tabs.

Similarly to electrode assembly 120 shown in FIG. 6, electrode assembly 320 can be employed in the pouch type lithium rechargeable battery.

As described above, the electrode assembly and the pouch type lithium rechargeable battery having the same according to the present invention can reduce the total width of a battery cell while maintaining maximally the distance between the electrode tabs that enables to prevent a short between the electrode tabs and between the electrode tabs and the electrode plates in such a manner that portions of the insulation members positioned outwardly from the boundary at which the electrode tabs are protruded from the electrode plates are formed more widely than the electrode tabs and portions positioned inwardly from the boundary are formed to have the same width as the electrode tabs. Accordingly, the electrode assembly and the pouch type lithium rechargeable battery having the same according to the present invention can be applied to a small-sized battery.

Although preferred embodiments of the present invention have been described for illustrative purpose, those skilled in the art will appreciate that various modifications and changes thereof are possible without departing from the scope and spirit of the present invention, and all modifications and changes are intended to be included within the description of the claims.

What is claimed is:

1. An electrode assembly comprising:
   a positive electrode plate including a positive electrode coating portion and a positive electrode non-coating portion, a positive electrode active material coated on at least one side of the positive electrode coating portion;
   a negative electrode plate including a negative electrode coating portion and a negative electrode non-coating portion, a negative electrode active material coated on at least one side of the negative electrode coating portion;
   a separator interposed between the positive electrode plate and the negative electrode plate to insulate the positive electrode plate from the negative electrode plate;
   a positive electrode tab including a positive electrode tab protrusion and a positive electrode tab body, the positive electrode tab protrusion protruding out of the positive electrode plate along a first direction, the positive electrode tab body coupled to the positive electrode non-coating portion;
   a negative electrode tab including a negative electrode tab protrusion and a negative electrode tab body, the negative electrode tab protrusion protruding out of the negative electrode plate along the first direction, the negative electrode tab body coupled to the negative electrode non-coating portion;

a positive insulation member formed on the positive electrode tab covering an interface between the positive electrode tab protrusion and the positive electrode tab body, the positive insulation member including a positive insulation wide portion and a positive insulation narrow portion, the positive insulation wide portion covering a portion of the positive electrode tab protrusion, a width of the positive insulation wide portion being greater than a width of the positive insulation narrow portion; and a negative insulation member formed on the negative electrode tab covering an interface between the negative electrode tab protrusion and the negative electrode tab body, the negative insulation member including a negative insulation wide portion and a negative insulation narrow portion, the negative insulation wide portion covering a portion of the negative electrode tab protrusion, a width of the negative insulation wide portion being greater than a width of the negative insulation narrow portion.

2. The electrode assembly as claimed in claim 1, comprised of the positive insulation wide portion being spaced apart by a first predetermined distance along the first direction from the interface between the positive electrode tab protrusion and the positive electrode tab body.

3. The electrode assembly as claimed in claim 2, comprised of the separator protruding along the first direction by a second predetermined distance from the positive electrode plate.

4. The electrode assembly as claimed in claim 2, wherein the first predetermined distance is substantially the same as the second predetermined distance.

5. The electrode assembly as claimed in claim 1, wherein the positive electrode plate, the separator, and the negative electrode plate are formed into a stack, and the stack is wound about both of the positive electrode tab and the negative electrode tab; the wound stack having a top surface through which the positive electrode tab and the negative electrode tab protrude, and a side surface; the side surface having a flat portion and a curved portion.

6. The electrode assembly as claimed in claim 5, wherein none of edges, which are formed along the first direction, of the positive insulation wide portion is aligned with an edge, which are formed along the first direction, of the positive insulation narrow portion, so that the positive insulation member has a shape of 'T', with the positive insulation wide portion having '-' shape and with the positive insulation narrow portion having '|' shape; and none of edges, which are formed along the first direction, of the negative insulation wide portion is aligned with an edge, which are formed along the first direction, of the negative insulation narrow portion, so that the negative insulation member has a shape of 'T', with the negative insulation wide portion having '-' shape and with the negative insulation narrow portion having '|' shape.

7. The electrode assembly as claimed in claim 6, wherein the width of the positive insulation wide portion is greater than a width of the positive electrode body, and the width of the negative insulation wide portion is greater than a width of the negative electrode body.

8. The electrode assembly as claimed in claim 6, wherein the width of the positive insulation narrow portion is substantially the same as the width of the positive electrode tab body, and the width of the negative insulation narrow portion is substantially the same as the width of the negative electrode tab body.

9. The electrode assembly as claimed in claim 8, comprised of the stack wrapping both of the positive insulation narrow portion and the negative insulation narrow portion about the first direction.

10. The electrode assembly as claimed in claim 9, wherein the width direction of the positive insulation wide portion is substantially parallel to the flat portion of the side surface of the wound stack and one edge of the positive insulation wide portion intrudes into the curved portion of the side surface of the wound stack when viewed from the top surface of the wound stack, and the width direction of the negative insulation wide portion is substantially parallel to the flat portion of the side surface of the wound stack and one edge of the negative insulation wide portion intrudes into the curved portion of the side surface of the wound stack when viewed from the top surface of the wound stack.

11. The electrode assembly as claimed in claim 6, wherein the positive insulation wide portion and the positive insulation narrow portion are separated.

12. The electrode assembly as claimed in claim 11, comprised of the positive insulation wide portion including an insulation tape.

13. The electrode assembly as claimed in claim 12, comprised of the positive insulation narrow portion including a laminated tape.

14. The electrode assembly as claimed in claim 13, wherein each of the insulation tape and the laminated tape is made of one selected from polyphenylene sulfide (PS), polyimide (PI), and polypropylene (PP).

15. The electrode assembly as claimed in claim 6, wherein the positive insulation wide portion and the positive insulation narrow portion are integrally formed.

16. The electrode assembly as claimed in claim 5, wherein one of edges, which are formed along the first direction, of the positive insulation wide portion is aligned with an edge, which are formed along the first direction, of the positive insulation narrow portion, so that the positive insulation member has a shape of an inverted 'L', with the positive insulation wide portion having '-' shape and with the positive insulation narrow portion having '|' shape.

17. The electrode assembly as claimed in claim 16, wherein the width direction of the positive insulation wide portion is substantially parallel to the flat portion of the side surface of the wound stack.

18. The electrode assembly as claimed in claim 17, wherein the width of the positive insulation narrow portion is substantially the same as a width of the positive electrode tab body.

19. A pouch type lithium rechargeable battery comprising:

a pouch; and an electrode assembly stored in the pouch, the electrode assembly comprising:

a positive electrode plate including a positive electrode coating portion and a positive electrode non-coating portion, a positive electrode active material coated on at least one side of the positive electrode coating portion;

a negative electrode plate including a negative electrode coating portion and a negative electrode non-coating portion, a negative electrode active material coated on at least one side of the negative electrode coating portion;

a separator interposed between the positive electrode plate and the negative electrode plate to insulate the positive electrode plate from the negative electrode plate;

a positive electrode tab including a positive electrode tab protrusion and a positive electrode tab body, the positive electrode tab protrusion protruding out of the positive electrode plate along a first direction, the positive electrode tab body coupled to the positive electrode non-coating portion;

a negative electrode tab coupled to the negative electrode non-coating portion, one end of the negative electrode tab protruding out of the negative electrode plate along the first direction; and a positive insulation member formed on the positive electrode tab covering an interface between the positive electrode tab protrusion and the positive electrode tab body, the positive insulation member including a positive insulation wide portion and a positive insulation narrow portion, the positive insulation wide portion covering a portion of the positive electrode tab protrusion, a width of the positive insulation wide portion being greater than a width of the positive insulation narrow portion.

20. The pouch type lithium rechargeable battery as claimed in claim 19, wherein none of edges, which are formed along the first direction, of the positive insulation wide portion is aligned with an edge, which are formed along the first direction, of the positive insulation narrow portion, so that the positive insulation member has a shape of 'T', with the positive insulation wide portion having '-' shape and with the positive insulation narrow portion having '|' shape.

* * * * *